(12) United States Patent
Pang et al.

(10) Patent No.: US 6,554,249 B2
(45) Date of Patent: Apr. 29, 2003

(54) PLUG VALVE HAVING SEAL SEGMENTS WITH BOOSTER SPRINGS

(75) Inventors: Rick Wei-Shou Pang, Houston, TX (US); Tep Ungchusri, The Woodlands, TX (US); Sergio Castillo, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 26 days.

(21) Appl. No.: 09/872,425

(22) Filed: May 30, 2001

(65) Prior Publication Data

US 2002/0179876 A1 Dec. 5, 2002

(51) Int. Cl.[7] .............................................. F16K 25/00
(52) U.S. Cl. ........................ 251/174; 251/309; 251/316
(58) Field of Search ........................ 251/174, 309–312, 251/316

(56) References Cited

U.S. PATENT DOCUMENTS

| | | | | | |
|---|---|---|---|---|---|
| 946,877 A | * | 1/1910 | Rothchild | .................... | 137/584 |
| 2,480,529 A | * | 8/1949 | Waag | ......................... | 277/345 |
| 2,883,146 A | * | 4/1959 | Knox | ......................... | 251/159 |
| 3,061,267 A | * | 10/1962 | Hamer | ....................... | 251/172 |
| 3,425,661 A | * | 2/1969 | Mayo | ......................... | 251/175 |
| 4,022,427 A | * | 5/1977 | Read | ........................... | 251/343 |
| 4,506,696 A | * | 3/1985 | von Pechmann | ....... | 137/246.11 |
| 4,911,408 A | * | 3/1990 | Kemp | ......................... | 251/174 |
| 5,676,348 A | * | 10/1997 | Ungchusri et al. | ......... | 251/316 |

* cited by examiner

*Primary Examiner*—David A. Scherbel
*Assistant Examiner*—Melvin A. Cartagena
(74) *Attorney, Agent, or Firm*—Henry C. Query, Jr.

(57) ABSTRACT

The invention is directed to a plug valve comprising a body which includes an inlet port, an outlet port and a cavity that is connected between the inlet and outlet ports; first and second seal segments which are mounted in the cavity and which each comprise a through bore that is coaxial with the inlet and outlet ports; the through bores and the inlet and outlet ports defining a flow passage through the body; a plug member which is rotatably positioned between the first and second seal segments and which includes a hole that extends transversely therethrough; the plug member being rotatable between an open position in which the hole is aligned with the flow passage and a closed position in which the hole is offset from the flow passage; and at least a first booster spring which is positioned between the first seal segment and the body to bias the first seal segment against the plug member.

20 Claims, 3 Drawing Sheets

PLUG VALVE HAVING SEAL SEGMENTS WITH BOOSTER SPRINGS

BACKGROUND OF THE INVENTION

The present invention relates to a plug valve. More particularly, the invention relates to a plug valve having a number of booster springs for biasing two opposing seal segments against a central plug in order to eliminate the float between the seal segments and the plug.

Prior art plug valves typically comprise a body which has separate inlet and outlet ports that are connected by a central cavity, a cylindrical plug member which is rotatably positioned between two semi-cylindrical seal segments that are mounted in the cavity, and a valve stem which is connected to both the plug member and an external handle. Each seal segment comprise a through bore which together with the inlet and outlet ports forms a flow passage through the body. In addition, the plug member comprises a transverse hole extending therethrough, and each seal segment forms a metal-to-metal circular seal with the plug member which is concentric with the flow passage. In operation, the plug member is rotatable between a valve open position, in which the hole is aligned with the flow passage, and a valve closed position, in which the hole is offset from the flow passage.

These prior art plug valves are usually designed to have a certain degree of clearance or "float" between the plug member and the seal segments, and the plug member is loosely mounted in the body so as to be able to drift between the seal segments during operation of the plug valve. This enables the pressure within the gate cavity to force the plug member into tight metal-to-metal sealing engagement against the downstream seal segment when the valve is in the closed position. However, in certain circumstances this float also allows the seal segments and the plug member to separate when the valve is in either the open or the closed position. When this happens, fine particles which are being conveyed through the plug valve can migrate between the seal segments and the plug member and consequently prevent the plug member from forming an effective metal-to-metal seal with the downstream seal segment when the valve is closed.

SUMMARY OF THE INVENTION

In accordance with the present invention, these and other disadvantages in the prior art are overcome by providing a plug valve having a body which includes an inlet port, an outlet port, and a cavity that is connected between the inlet and outlet ports; first and second seal segments which are mounted in the cavity and which each comprise a through bore which is coaxial with the inlet and outlet ports; the through bores and the inlet and outlet ports defining a flow passage through the body; a plug member which is rotatably positioned between the first and second seal segments and which includes a hole that extends transversely therethrough; wherein the plug member is rotatable between an open position in which the hole is aligned with the flow passage and a closed position in which the hole is offset from the flow passage; and a first booster spring which is positioned between the first seal segment and the body to bias the first seal segment against the plug member.

In a preferred embodiment of the invention, the plug valve includes first and second booster springs which are mounted in respective grooves that are formed in an outer face of the first seal segment. In yet another embodiment of the invention, the plug valve includes a third booster spring which is positioned between the second seal segment and the body to bias the second seal segment against the plug member. In still another embodiment of the invention, the plug valve includes third and fourth booster springs which are mounted in respective grooves that are formed in an outer face of the second seal segment.

In this manner, the booster springs will force the first and second seal segments against the plug member and thereby prevent fine particles from migrating between the seal segments and the plug member when the valve is in the open position. Consequently, the plug member will be able to form a clean, tight metal-to-metal seal with the downstream seal segment when the valve is closed.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
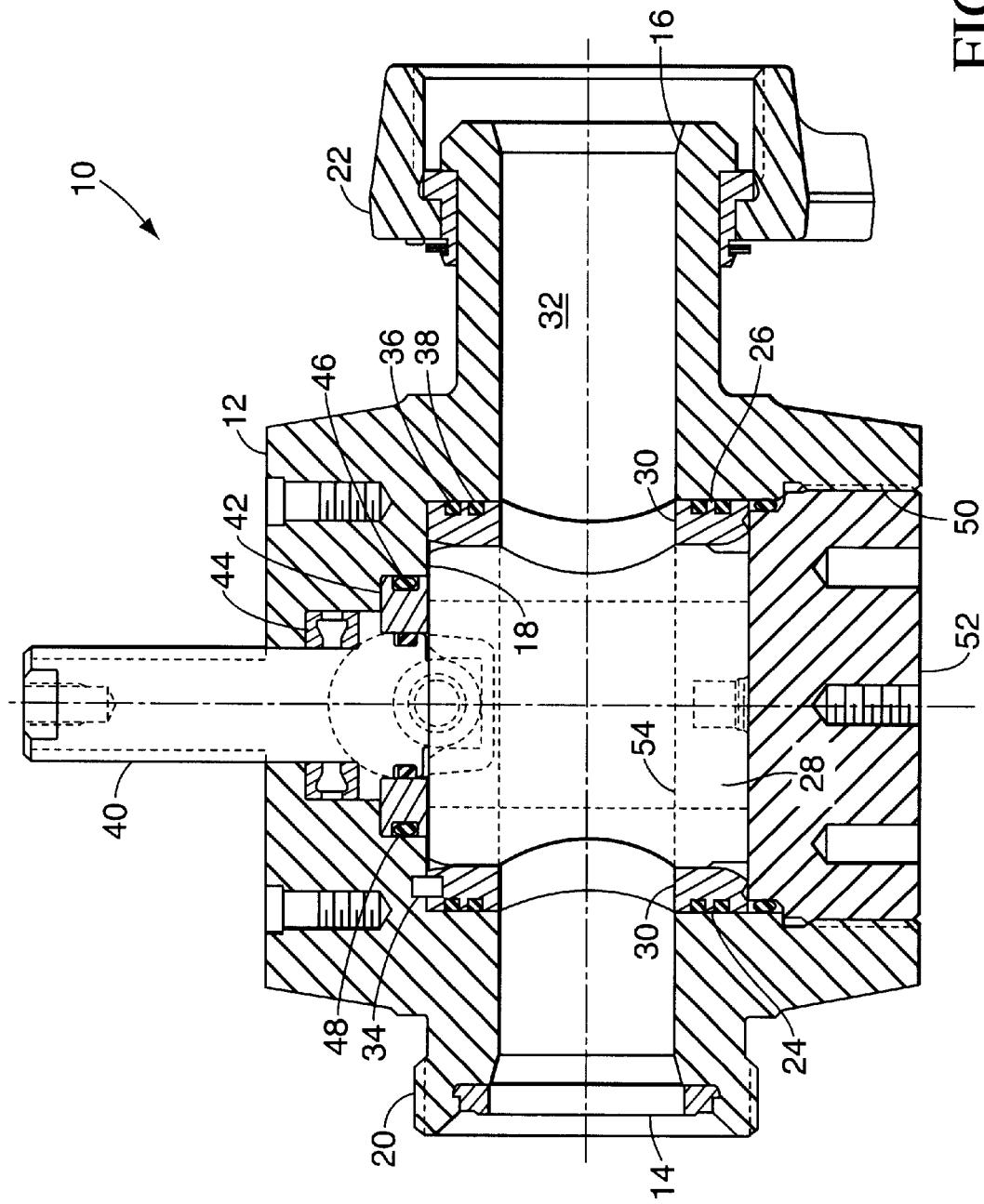
FIG. 1 is a cross-sectional view of a prior art plug valve.

Referring to FIG. 1, a prior art plug valve 10 is shown to comprise a body 12 which includes an inlet port 14 and an outlet port 16 that are connected by a central cavity 18. The plug valve 10 may be provided with suitable connection members, such as threads 20 or a wing nut 22, to enable the body 12 to be connected to a fluid conduit. The plug valve 10 also includes two semi-cylindrical seal segments 24, 26, each of which is mounted in the cavity 18 adjacent a respective port 14,16, and a cylindrical plug member 28 which is rotatably positioned between the seal segments. Each seal segment 24, 26 includes a through bore 30 which is coaxially aligned with the inlet and outlet ports 14,16 to thereby form a flow passage 32 that extends through the body 12. In addition, each seal segment 24, 26 is ideally fixed within the cavity 18 by one or more pins 34 and sealed to the body by preferably two concentric seals 36, 38.

The plug member 28 is pivotably connected to a valve stem 40 which in turn is rotationally supported within the body by a stem adapter 42 and a bearing assembly 44. In addition, the valve stem 40 is sealed to the body 12 with a first annular seal 46 that is engaged between the body and the stem adapter 42 and a second annular seal 48 that is engaged between the stem adapter and the valve stem. The assembly of the seal segments 24, 26 and the plug member 28 within the cavity 18 is facilitated by providing the body 12 with an access port 50 that is sealed by a removable body cap 52.

In operation of the plug valve 10, the valve stem 40 is turned by a suitable handle (not shown) to rotate the plug member 28 between a valve open position, wherein a hole 54 which extends transversely though the plug member is aligned with the flow passage 32, and a valve closed position, wherein the hole 54 is offset from the flow passage. In the closed position of the plug valve, the fluid pressure within the cavity 18 will force the plug member 28 against the downstream seal segment, for example the seal segment 26, to thereby form a circular metal-to-metal seal between the plug member and the seal segment which is concentric with the flow passage 32. This metal-to-metal seal will prevent the fluid in the cavity 18 from flowing past the downstream seal segment. However, if the gate valve 10 is designed with a certain degree of float between the seal segments 24, 26 and the plug member 28, particles in the fluid may migrate between the plug member and the seal segments when the valve is in the open position and consequently prevent the plug member from forming an effective metal-to-metal seal with the downstream seal segment when the valve is closed.

The present invention prevents particles from migrating between the seal segments 24, 26 and the plug member 28 by biasing the seal segments firmly against the plug member at all times. Referring to FIGS. 2–5, the plug valve of the present invention includes at least one and preferably two booster springs 56 between at least the downstream seal segment and the body 12 to bias the seal segment against the plug member 28. Ideally, the plug valve comprises preferably two booster springs 56 between each seal segment 24, 26 and the body 12 to bias both seal segments against the plug member 28. Thus, while the plug member 28 may be permitted to drift within the cavity 18, the booster springs 56 will maintain the seal segments 24, 26 against the plug member at all times and thereby prevent particles from migrating between the plug member and the seal segments.

Figure 2A:
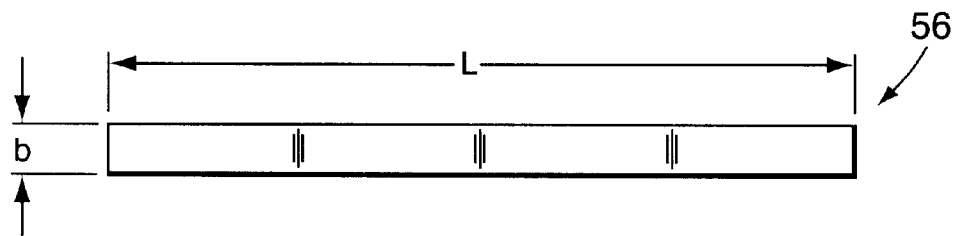
FIG. 2A is a top view of the booster spring component of the plug valve of the present invention.
Figure 2B:
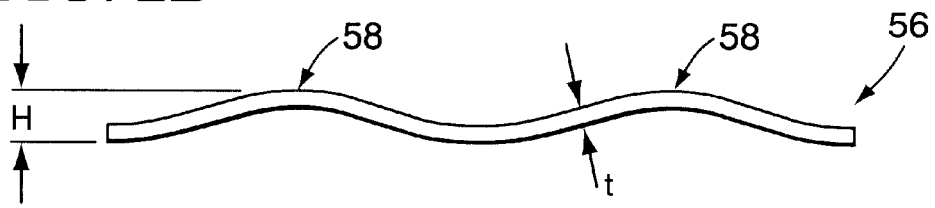
FIG. 2B is a front elevation view of the booster spring shown in FIG. 2A.

Referring the FIGS. 2A and 2B, each booster spring 56 is shown to comprise an elongated body having a length L, a width b, and a thickness t. The length L is substantially greater than the width b and, in a preferred embodiment of the invention, the width b is at least twice as great as the thickness t. Also, each booster spring 56 ideally comprises a generally wave-like shape that is defined by a number of bends 58 which extend perpendicular to the width b of the body. Each bend optimally comprises a similar magnitude H as measured from the bottom of the body to the top of the bend. The booster spring 56 is made of a resilient, preferably metal material, such as stainless steel, and the bends 58 therefore allow the booster spring 56 to expand and contract in a direction perpendicular to the width b. In an exemplary three inch plug valve, each booster spring 56 comprises a length L of approximately 4.865 inches, a thickness t of approximately 0.093 inch, a width b of approximately 0.500 inch, and two bends 58 each having a magnitude H of about 0.138 inch.

Figure 3:
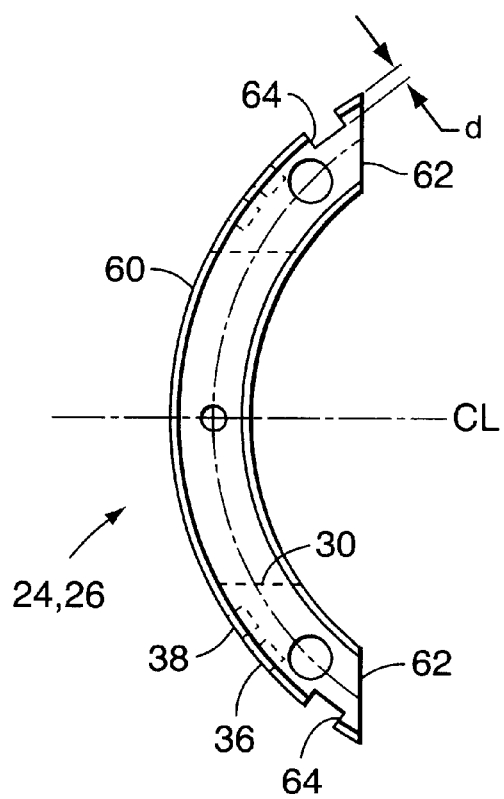
FIG. 3 is a top view of the seal segment component of the plug valve of the present invention.
Figure 4:
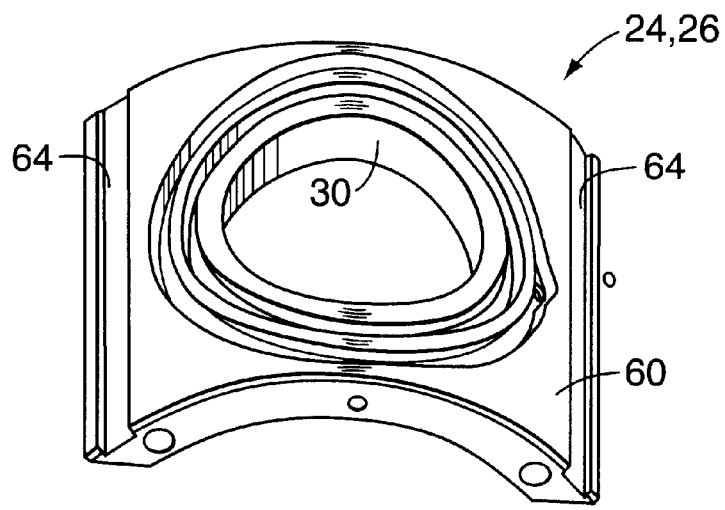
FIG. 4 is a perspective view of the seal segment shown in FIG. 3.
Figure 5:
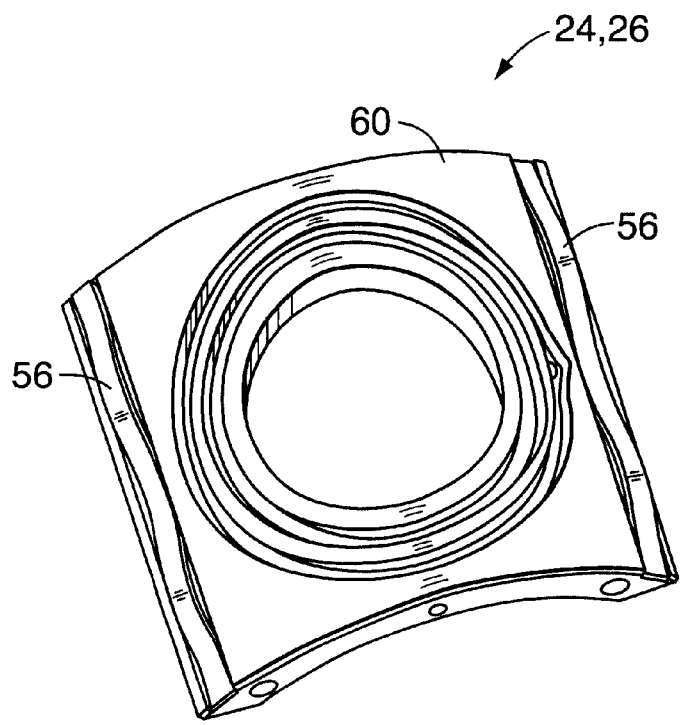
FIG. 5 is a perspective view of the seal segment shown in FIG. 4 with the booster spring of FIG. 2A installed therein.

As shown in FIGS. 3 and 4, each seal segment 24, 26 comprises an outer face 60 which extends between opposite end faces 62, and each booster spring 56 is preferably positioned in a respective groove 64 which is formed in a portion of the outer face 60 that is located between the seals 36, 38 and an adjacent end face 62. Each groove 64 extends substantially from the top to the bottom of the seal segment and is oriented generally parallel to the rotational axis of the plug member 28. In addition, each groove 64 has a depth d which is slightly smaller than the magnitude H of the bends 58 of the booster spring 56. Thus, as shown in FIG. 5, the bends 58 will protrude from the groove 64 and engage the body 12 when the plug valve is assembled. The depth d and the magnitude H are selected based on the dimensions of the cavity 18, the seal segments 24, 26 and the plug member 28 to ensure that the booster springs 56 will bias the seal segments tightly against the plug member. In the exemplary plug valve described above, the depth d of each groove 64 is approximately 0.100 inch.

Thus, when the plug valve of the present invention is assembled, the booster springs 56 will bias the seal segments 24, 26 against the plug member 28 and thereby ensure that a tight metal-to-metal seal is maintained between each seal segment and the plug member at all times. Consequently, when the plug valve is in the open position, this metal-to-metal seal will prevent particles from migrating between the seal segments and the plug member. Therefore, when the plug valve is closed, the plug member will be able to form an effective metal-to-metal seal with the downstream seal segment.

Moreover, the elongated shape of the booster springs 56 and their orientation relative to the seal segments 24, 26 will ensure that the spring force acting on the seal segments is relatively uniform from substantially the top to the bottom of the seal segments. This in turn will ensure that the metal-to-metal seal between each seal segment and the plug member 28 is generally uniform and will also prevent the seal segments from wobbling relative to the plug member. Such wobble could allow particles to migrate between the seal segments and the plug member and thus prevent the plug member from forming an effective seal with the downstream seal segment when the plug valve is closed.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. A plug valve comprising:
    a body which includes an inlet port, an outlet port, and a cavity that is connected between the inlet and outlet ports;
    first and second seal segments which are mounted in the cavity and which each comprise a through bore that is coaxial with the inlet and outlet ports;
    the through bores and the inlet and outlet ports defining a flow passage through the body;
    a plug member which is rotatably positioned between the first and second seal segments and which includes a hole that extends transversely therethrough;
    wherein the plug member is rotatable between an open position in which the hole is aligned with the flow passage and a closed position in which the hole is offset from the flow passage; and
    a first booster spring which is positioned between the first seal segment and the body to bias the first seal segment against the plug member;
    wherein the first booster spring comprises an elongated body that includes at least one transverse bend.

2. The plug valve of claim 1, wherein the body comprises at least two transverse bends.

3. The plug valve of claim 1, wherein the body comprises a thickness and a width that is greater than the thickness, and wherein the bend extends generally perpendicular to the width.

4. The plug valve of claim 1, wherein the first seal segment comprises an outer face which is disposed adjacent the body and an elongated first groove which is formed in the outer face, and wherein the first booster spring is positioned in the first groove.

5. The plug valve of claim 4, wherein the first groove is oriented approximately parallel to the rotational axis of the plug member.

6. The plug valve of claim 1, further comprising:
a second booster spring positioned between the first seal segment and the body;
wherein the second booster spring comprises an elongated body that includes at least one transverse bend.

7. The plug valve of claim 6, wherein the body of each of the first and second booster springs comprises at least two transverse bends.

8. The plug valve of claim 6, wherein the body of each of the first and second booster springs comprises a thickness and a width that is greater than the thickness, and wherein the bend extends generally perpendicular to the width.

9. The plug valve of claim 6, wherein the first seal segment comprises an outer face which is disposed adjacent the body and elongated first and second grooves which are formed in the outer face, and wherein the first and second booster springs are positioned in the first and second grooves, respectively.

10. The plug valve of claim 9, wherein the first and second grooves are oriented approximately parallel to the rotational axis of the plug member.

11. The plug valve of claim 6, further comprising third and fourth booster springs positioned between the second seal segment and the body to bias the second seal segment against the plug member.

12. The plug valve of claim 11, wherein the booster springs each comprise an elongated body that includes at least one transverse bend.

13. The plug valve of claim 12, wherein the body comprises at least two transverse bends.

14. The plug valve of claim 12, wherein the body comprises a thickness and a width that is greater than the thickness, and wherein the bend extends generally perpendicular to the width.

15. The plug valve of claim 12, wherein the first seal segment comprises a first outer face which is disposed adjacent the body and elongated first and second grooves which are formed in the first outer face, wherein the second seal segment comprises a second outer face which is disposed adjacent the body and elongated third and fourth grooves which are formed in the second outer face, and wherein the first, second, third and fourth booster springs are positioned in the first, second, third and fourth grooves, respectively.

16. The plug valve of claim 15, wherein the grooves are oriented approximately parallel to the rotational axis of the plug member.

17. The plug valve of claim 1, further comprising a second booster spring which is positioned between the second seal segment and the body to bias the second seal segment against the plug member.

18. A plug valve comprising:
a body which includes an inlet port, an outlet port and a cavity that is positioned between and communicates with the inlet and outlet ports;
first and second seal segments which are mounted in the cavity and which each comprise a through bore that is coaxial with the inlet and outlet ports;
a plug member which is rotatably positioned between the first and second seal segments and which includes a hole that extends transversely therethrough;
wherein the plug member is rotatable between an open position in which the hole is aligned with the through bores and a closed position in which the hole is offset from the through bores; and
first and second booster springs which are each positioned between the first seal segment and the body;
wherein the first and second booster springs each comprise an elongated body that includes at least one transverse bend; and
wherein the first and second booster springs are each oriented generally parallel to the rotational axis of the plug member.

19. The plug valve of claim 18, further comprising:
third and fourth booster springs which are each positioned between the second seal segment and the body;
wherein the third and fourth booster springs each comprise an elongated body that includes at least one transverse bend; and
wherein the third and fourth booster springs are each oriented generally parallel to the rotational axis of the plug member.

20. The plug valve of claim 19, wherein each of the first and second booster springs is positioned in a corresponding groove which is formed in the first seal segment, and each of the third and fourth booster springs is positioned in a corresponding groove which is formed in the second seal segment.

* * * * *